United States Patent [19]

Jankower et al.

[11] Patent Number: 4,873,091

[45] Date of Patent: Oct. 10, 1989

[54] CONTROLLED RELEASE FORMULATING EMPLOYING RESILIENT MICROBEADS

[75] Inventors: Laura J. Jankower; Larry W. Shipley, both of Lafayette, La.

[73] Assignee: Advanced Polymer Systems, Inc., Redwood City, Calif.

[21] Appl. No.: 197,375

[22] Filed: May 23, 1988

[51] Int. Cl.$^4$ ............. A61K 9/14; C08J 9/28
[52] U.S. Cl. ....................... 424/489; 424/78; 424/83; 521/64
[58] Field of Search ............ 521/64; 424/489, 78, 424/489, 83

[56] References Cited

U.S. PATENT DOCUMENTS

| | | | |
|---|---|---|---|
| 4,076,656 | 2/1978 | White et al. | 521/64 |
| 4,089,800 | 5/1978 | Temple | 521/64 X |
| 4,092,381 | 5/1978 | Halpern et al. | 521/64 X |
| 4,357,312 | 11/1982 | Hsieh et al. | 521/64 X |
| 4,524,155 | 6/1985 | Walch et al. | 521/64 |
| 4,612,334 | 9/1986 | Jones et al. | 521/64 X |
| 4,690,825 | 9/1987 | Won | 424/501 |
| 4,734,196 | 3/1988 | Kono et al. | 521/64 X |
| 4,742,086 | 5/1988 | Masamizu et al. | 521/64 X |

OTHER PUBLICATIONS

Trilene Specification Sheets (4) and Abstract Sheets (2), Uniroyal Chemical Company, Inc.

*Primary Examiner*—Thurman K. Page
*Attorney, Agent, or Firm*—Townsend and Townsend

[57] ABSTRACT

Microscopic particles containing a continuous network of pores open to the particle surface are manufactured of a spongy material. The particles are useful as controlled-release delivery systems for active substances intended for a wide range of uses including topical applications. The spongy character of the particles enhances their usefulness in applications where high pressure or high temperature are encountered, and where exceptional smoothness of feel is required.

94 Claims, No Drawings

CONTROLLED RELEASE FORMULATING EMPLOYING RESILIENT MICROBEADS

BACKGROUND OF THE INVENTION

The present invention relates to controlled release compositions comprised of porous polymeric particles of microscopic dimensions, retaining within their pores various types of impregnants useful as active ingredients for a wide variety of medicinal, cosmetic, and other utilitarian and esthetic purposes Controlled release formulations consisting of porous particles of an inert solid material with active substances retained in the pores are disclosed in Won. U.S. Pat. No. 4,690,825, issued Sept. 1, 1987, and pending application Ser. No. 91,641, filed Aug. 31, 1987 (commonly assigned herewith) The active ingredients are generally liquid in form, retained inside the pores of the particles by capillary forces. The pores are interconnected and open to the particle surface, permitting full diffusion outward of the retained active ingredients. In some cases, the formulation consists solely of the particles, and in others the formulation consists of a dispersion of the particles in a suitable vehicle to resemble conventional skin preparations such as liniments, gels, lotions or ointments. In either case, release of the active ingredient from the pores is controlled by diffusion. although release upon demand is achieved by agitation or rubbing of the formulation.

The particles disclosed in the patent and application referenced above are generally rigid in character, limiting their usefulness to applications where high pressures are not encountered, and where a small degree of frictioin and abrasion caused by rigid particles is not a problem.

SUMMARY OF THE INVENTION

It has now been discovered that controlled release formulations involving porous particles impregnated with active ingredients may be prepared in which the particles are resilient or spongy in character rather than rigid. In particular, it has been discovered that porous microbeads with an interconnected continuous network of pores open to the exterior of the microbead surface may be prepared from rubber materials utilizing technologies which are the same as or similar to those disclosed in connection with the preparation of their rigid counterparts. The spongy, rubber-like microbeads thus formed are capable of retaining liquid impregnants by capillary forces, as well as solid or semi-solid impregnants (useful for example in formulations where the microbeads are dispersed in liquid or fluid carriers in which the solids dissolve and diffuse). As such, the microbeads are capable of controlled-release delivery of the impregnants in the same manner as their rigid counterparts, and yet have the added advantages of durability under high pressures and temperatures and a broader range of application to include systems and formulations where extremely low abrasion and a high degree of smoothness to the touch is needed.

DETAILED DESCRIPTION OF THE INVENTION AND PREFERRED EMBODIMENTS

The microbeads of the present invention are formed of curable elastomers. Preferred such elastomers are those which are curable by crosslinking. Examples include isoprene rubbers, butadiene rubbers, chloroprene rubbers, isobutylene-isoprene rubbers, nitrile-butadiene rubbers, styrene-butadiene rubbers, and ethylene-propylene-diene terpolymers. Among these groups, the preferred are ethylene-propylene-diene terpolymers. The diene monomers in these rubbers cover a wide range of structures, including straight-chain diolefins, cyclic dienes and bicyclic dienes including bridged ring dienes. Examples of such dienes are 1,4hexadiene and longer chain analogs and homologs thereof, dicyclopentadiene, and ethylidene norbornene (notably 5-ethylidene-2-norbornene). Each of the latter two contain a bridged ring, and their structures are as follows:

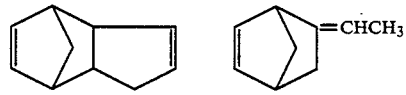

In further preferred embodiments of the invention, the rubber is an ethylene-propylene-diene rubber which has been prepared from an ethylene-propylene-diene (EPDM) prepolymer, cured according to conventional techniques. Preferred such prepolymers are those having a molecular weight ranging from about 1000 to about 30,000, preferably from about 5000 to about 10,000, and an iodine number (representing the degree of unsaturation in the molecule) ranging from about 5 to about 50, preferably from about 8 to about 30.

While the particles may vary widely in size, those falling within the range of about one to about 200 microns in diameter will provide the best results in terms of ease of formulating and imparting a smooth feel to the touch.

The pore dimensions within the spheres may also vary widely. with optimum dimensions depending on the chemical characteristics of the polymers used as well as the diffusive characteristics of the adjuvant retained inside. Different systems will thus call for different optimum ranges of pore volume distribution to obtain the most desirable properties for the overall formulation. In general. however. best results are obtained with total pore volumes ranging from about 0.01 to about 4.0 cc/g, preferably from about 0.1 to about 2.0, surface areas ranging from about 1 to about 500 m$^2$/g, preferably from about 20 to about 200, and average pore diameters ranging from about 0.001 to about 3.0 micron, preferably from about 0.003 to about 1.0 micron. Following conventional methods of measuring and expressing pore sizes, the pore diameters are measured by techniques such as nitrogen adsorption isotherms or mercury intrusion and are based on the model of a pore of cylindrical shape.

The particles are conveniently formed by suspension polymerization in a liquid-liquid system. In general, a solution containing monomers and a polymerization catalyst (if used) is formed which is immiscible with water. An inert liquid fully miscible with the solution but immiscible with water is included in the solution. The solution is then suspended in an aqueous solution, which generally contains additives such as surfactants and dispersants to promote the suspension. Once the suspension is established with discrete droplets of the desired size, polymerization is effected (typically by activating the reactants by either increased temperature or irradiation). Once polymerization is complete, the resulting resilient solid particles are recovered from the suspension. The particles are solid porous structures, the polymer having formed around the inert liquid, thereby forming the pore network. The liquid has accordingly served as a porogen, or poreforming agent, and occupies the pores of the formed beads.

In certain cases, the species intended as the active ingredient to be delivered by controlled release may serve as the porogen, in which case the porous beads recovered from the suspension immediately after polymerization are substantially ready for use, following removal of surface moisture, and any further processing steps of this nature. In these cases, microbead formation and incorporation of the active species are performed in a single step. This may accordingly be termed a one-step procedure. Active species which can be used in this manner are those which meet the following criteria:

1. They are either fully miscible with the monomer mixture or capable of being made fully miscible by the addition of a minor amount of non-water-miscible solvent;

2. They are immiscible with water, or at most only slightly soluble; and

3. They are inert with respect to the monomers, and stable when in contact with any polymerization catalyst used and when subjected to any conditions needed to induce polymerization (such as temperature and radiation).

For active species which do not meet these criteria, their placement inside the pores may be achieved by impregnation of preformed dry porous polymer beads. The product is thus prepared in two steps performed in sequence, the polymerization being performed first with a substitute porogen which is then removed and replaced by the active species. Materials suitable as substitute porogens will be liquid substances which meet the above criteria and which have the further characteristic of being readily extracted from the pore network of the beads once polymerization is complete. This covers a wide range of substances, notably inert, nonpolar organic solvents. Some of the most convenient examples are alkanes, cycloalkanes, and aromatics. Examples of such solvents are alkanes of 5 to 12 carbon atoms, straight or branched chain, cycloalkanes of 5 to 8 carbon atoms, benzene, and alkyl-substituted benzenes such as toluene and the xylenes. Porogens of other types include $C_{12}$–$C_{15}$ alcohols benzoate, perfluoro polyethers, and silicone oils. Examples of silicone oils are polydimethylcyclosiloxane, hexamethyldisiloxane, cyclomethicone, dimethicone, amodimethicone, trimethylsilylamodimethicone, polysiloxane-polyalkyl copolymers (such as stearyl dimethicone and cetyl dimethicone), dialkoxydimethylpolysiloxanes (such as stearoxy dimethicone), polyquaternium 21, dimethicone propyl PG-Betaine, dimethicone copolyol and cetyl dimethicone copolyol.

Once polymerization is complete, the porogen may be removed by solvent extraction, evaporation, or similar conventional operations.

A further advantage of the use of this two-step process is that it permits the removal of unwanted species from the polymerized structures prior to impregnation with the active species. Examples of unwanted species include unreacted monomers, residual catalyst, and surface active agents and/or dispersants remaining on the sphere surfaces. A further advantage of this technique is that it permits one to select the amount and type of porogen as a means of controlling the pore characteristics of the finished bead. One is thus no longer bound by the limitations of the active species as they affect the structure of the bead itself. This also permits partial rather than full filling of the pores with active ingredient, and further control over pore size and distribution by selection among swelling and non-swelling porogens.

Extraction of the porogen and its replacement with (i.e., impregnation of the dry bead with) the adjuvant in the two-step procedure may be effected in a variety of ways, depending on the chemical nature of the porogen and its behavior in combination with that of the other species present. The beads are first recovered from the suspension by filtration, preferably using vacuum filtration apparatus (such as a Buechner funnel). The beads are then washed with an appropriate solvent to remove organic species not bound to the polymer. including surfactants having deposited on the bead surfaces from the aqueous phase, unreacted monomers and residual catalysts, and the porogen itself. An example of such a solvent is isopropanol, either alone or in aqueous solution. Once washing is complete, the solvent itself is removed by drying, preferably in a vacuu.

In certain cases, an alternative method of extraction may be used, i.e., where the porogen, unreacted monomer and water will form an azeotrope. In these cases, steam distillation is an effective way of extracting porogen from the beads. This again may be followed by drying under vacuum.

Once the beads are rendered dry and free of the substitute porogen and any unwanted organic materials, they are impregnated with the active species according to conventional techniques. The most convenient such technique is contact absorption, aided by solvents if necessary to enhance the absorption rate.

Active species which are solid at ambient conditions may be first melted by heating, then held in the molten state during the contact absorption. Once impregnation has occurred, the particles may be cooled to ambient temperature and the molten active species thus returned to solid form.

Certain active species may also be combined in a eutectic mixture to produce a low-melting composition usable in a manner similar to that of a melt. Melts and eutectics in general may be used in either the one-step or two-step procedure.

The polymerization process and the various parameters and process conditions involved can be selected and adjusted as a means of controlling the pore characteristics and consequently the capacity and release characteristics of the ultimate product. For example, proper selection of a catalyst and the amount thereof, together with the use of co-agents and other additives, and selection of the amount and type of porogen are means of attaining such control. Certain polymerization conditions may also be varied to such effect, including temperature, degree of agitation and any other factors affecting the rate of the polymerization reaction.

For EPDM rubbers, preferred polymerization catalysts or curing systems are free radical initiators, notably peroxide-type free radical initiators. Examples of peroxide initiators are tert-butyl perbenzoate, tert-butyl hydroperoxide, tert-butyl peracetate, 2,5-di(benzoylperoxy)-2,5-dimethylhexane, di-tert-butyl diperoxyazelate, tert-butyl peroxy-2-ethylhexanoate, tert-amyl peroctoate, 2,5-di(2-ethylhexanoylperoxy)-2,5-dimethylhexane, and tert-butyl peroxyneodecanoate. Peroxyester initiators are preferred. In many cases, it will be advantageous to include polyfunctional active olefins in the reaction mixture as additives to improve peroxide cross-linking efficiency. Examples are dimethylolpropane trimethacrylate, trimethylolpropane trimethacrylate, ethylene glycol dimethacrylate, triallyl cyanurate, zinc acrylate, N,N -meta-phenylenedimaleimide and polybutadiene. Preferred such olefins are dimethylolpropane trimethacrylate and trimethylolpropane trimethacrylate. In addition, metal soaps may be included as processing aids. Examples are naphthenates of sodium, potassium, manganese, lead, aluminum, magnesium, zinc, calcium, barium, cobalt, nickel, copper, iron and cesium; as well as octanoates of magnesium, zinc, manganese, calcium, barium, bismuth, lead, cobalt, iron and zirconium. Preferred metal soaps are cobalt naphthenate, manganese naphthenate and bismuth octoate.

The active species to be placed inside the pores may be dissolved in solvents to facilitate absorption into the pores. These solvents must be inert with respect to the particle itself, and the particle must be insoluble in these solvents. The solvents most appropriate for any given system will depend on the materials used as the particles as well as the active species, and the selection is well within the ability of the skilled technician. Examples of organic solvents which may be appropriate depending on the systems used are liquid petrolatum, petroleum ether, ethanol (especially for menthol and thymol) higher alcohols (especially for camphor), isopropyl myristate, diisopropyl adipate, and mineral oil.

Once absorption has occurred, the solvent can be evaporated or, if desired, retained together with the absorbed substance within the pores. Other formulating materials, such as carriers or adjuvants and the like can also be present, and will be incorporated into and onto the beads together with the active species of interest and any other materials present.

The active species should comprise between approximately 5% and approximately 65% of the total weight of the impregnated particles.

The following example is offered strictly for purposes of illustration, and is intended neither to limit nor define the invention in any manner.

EXAMPLE

A vessel was charged with 100.0 g of toluene and 20.0 g of TRILENE TM 65, an ethylene-propylene-diene elastomer with dicyclopentadiene as the diene. The elastomer is a product of Uniroyal Chemical Company, Inc, Middlebury, Conn., and is a liquid of specific gravity 0.84, molecular weight (viscosity average) 65, Brookfield viscosity 560,000 cps at 60° C. and 67,000 cps at 100° C., iodine number 19, and ethylene:propylene ratio 48:52. The mixture was heated until the elastomer was fully dissolved. The resulting solution (100 parts by weight) was combined with t-butyl perbenzoate (5 parts), 6% cobalt naphthenate (1 part) and trimethylolpropane trimethacrylate (5 parts).

A dispersant solution was prepared by combining Marasperse TM N-22 (a lignosulfonate dispersant, 5.7 parts by weight), gum arabic (5.7 parts) and water (470 parts), and stirring until dissolved. An additional 200 parts of water was then added, and the resulting solution was combined with g7.3 parts of the first solution.

A Ross mixer was used to convert the combined solutions into a suspension, with the TRILENE TM solution as the dispersed phase and the aqueous solution as the continuous phase. A droplet size of less than 50 microns was obtained by use of the mixer. Further amounts of t-butyl perbenzoate (7.5 parts), 6% cobalt naphthenate (1 part) and trimethylolpropane trimethacrylate (7.5 parts) were then added, and agitation was continued with the reaction vessel immersed in a temperature bath whose temperature was raised to 65° C.

After thirty minutes of agitation at 65° C., the temperature of the bath was raised to 110° C. for about two hours to remove the toluene. The remaining mixture was then passed through a filter to leave a fine powder of cured porous rubber beads having an average particle size of less than 10 microns.

The foregoing description is directed primarily to preferred embodiments and practices of the present invention. It will be readily apparent to those skilled in the art that further changes and modifications in the actual implementation of the concepts described herein can be made without departing from the spirit and scope of the invention as defined by the following claims.

What is claimed is:

1. A method for forming solid resilient particles containing a substantially continuous network of pores open to the exterior of said particles, said method comprising:
   (a) combining an ethylene-propylene-diene elastomeric prepolymer with a substantially water-immiscible liquid species which is inert with respect to said prepolymer to form a homogeneous, substantially water-immiscible liquid solution;
   (b) dispersing said liquid solution in an aqueous solution to form a suspension;
   (c) polymerizing said prepolymer in said suspension to form solid resilient particles containing said water-immiscible liquid species;
   (d) recovering said solid resilient particles from said suspension; and
   (e) extracting said water-immiscible liquid species from said solid resilient particles.

2. A method in accordance with claim 1 in which the diene in said ethylene-propylene-diene prepolymer is a member selected from the group consisting of dicyclopentadiene and 5-ethylidene-2-norbornene.

3. A method in accordance with claim 1 in which the diene in said ethylene-propylene-diene prepolymer is dicyclopentadiene.

4. A method in accordance with claim 1 in which said ethylene-propylene-diene prepolymer has a molecular weight ranging from about 1000 to about 30,000.

5. A method in accordance with claim 1 in which said ethylene-propylene-diene prepolymer has a molecular weight ranging from about 5000 to about 10, 000.

6. A method in accordance with claim 1 in which said ethylene-propylene-diene prepolymer has an iodine number of from about 5 to about 50.

7. A method in accordance with claim 1 in which said ethylene-propylene-diene prepolymer has an iodine number of from about 8 to about 30.

8. A method in accordance with claim 1 in which step (c) comprises heating said prepolymer in the presence of a peroxide free-radical initiator.

9. A method in accordance with claim 8 in which said peroxide free-radical initiator is a member selected from the group consisting of t-butyl perbenzoate and t-butyl hydroperoxide.

10. A method in accordance with claim 1 in which step (c) comprises heating said prepolymer in the presence of a peroxyester free-radical initiator.

11. A method in accordance with claim 10 in which said peroxyester free-radical initiator is t-butyl perbenzoate.

12. A method in accordance with claim 1 in which step (c) comprises heating said prepolymer in the presence of a peroxide free-radical initiator and a polyfunctional active olefin in an amount effective in improving the cross-linking efficiency thereof.

13. A method in accordance with claim 12 in which said polyfunctional active olefin is a member selected from the group consisting of trimethylolpropane trimethacrylate and dimethylolpropane trimethacrylate.

14. A method in accordance with claim 12 in which said polyfunctional active olefin is trimethylolpropane trimethacrylate.

15. A method in accordance with claim 1 in which step (a) further comprises combining said prepolymer with a metal soap.

16. A method in accordance with claim 15 in which said metal soap is a member selected from the group consisting of cobalt naphthenate. manganese octoate and bismuth octoate.

17. A method in accordance with claim 15 in which said metal soap is cobalt naphthenate.

18. A method in accordance with claim 1 in which said water-immiscible liquid species is a member selected from the group consisting of alkanes. cycloalkanes and aromatics.

19. A method in accordance with claim 1 in which said solid resilient particles have an average diameter from about 1 micron to about 200 microns.

20. A method in accordance with claim 1 in which said solid resilient particles have a total pore volume of about 0.01 cc/g to about 4.0 cc/g.

21. A method in accordance with claim 1 in which said solid resilient particles have a total pore volume of about 0.1 cc/g to about 2.0 cc/g.

22. A method in accordance with claim 1 in which said solid resilient particles have a surface area of about 1 $m^2/g$ to about 500 $m^2/g$.

23. A method in accordance with claim 1 in which said solid resilient particles have a surface area of about 20 $m^2/g$ to about 200 $m^2/g$.

24. A method in accordance with claim 1 in which said solid resilient particles have an average pore diameter of about 0.001 micron to about 3.0 microns.

25. A method in accordance with claim 1 in which said solid resilient particles have an average pore diameter of about 0.003 micron to about 1.0 micron.

26. A method for preparing a controlledrelease formulation of an active substance. said method comprising:
   (a) combining an ethylene-propylene elastomeric prepolymer with an impregnant comprising said active substance to form a homogeneous. substantially water-immiscible liquid solution;
   (b) dispersing said liquid solution in an aqueous solution to form a suspension;
   (c) polymerizing said prepolymer in said suspension to form solid resilient particles containing said impregnant; and
   (d) recovering said solid resilient particles from said suspension.

27. A method in accordance with claim 26 in which the diene in said ethylene-propylene-diene prepolymer is a member selected from the group consisting of dicyclopentadiene and 5-ethylidene-2-norbornene.

28. A method in accordance with claim 26 in which the diene in said ethylene-propylene-diene prepolymer is dicyclopentadiene.

29. A method in accordance with claim 26 in which said ethylene-propylene-diene prepolymer has a molecular weight ranging from about 1000 to about 30.000.

30. A method in accordance with claim 26 in which said ethylene-propylene-diene prepolymer has a molecular weight ranging from about 5000 to about 10.000.

31. A method in accordance with claim 26 in which said ethylene-propylene-diene prepolymer has an iodine number of from about 5 to about 50.

32. A method in accordance with claim 26 in which said ethylene-propylene-diene prepolymer has an iodine number of from about 8 to about 30.

33. A method in accordance with claim 26 in which step (c) comprises heating said prepolymer in the presence of a peroxide free-radical initiator.

34. A method in accordance with claim 33 in which said peroxide free-radical initiator is a member selected from the group consisting of t-butyl perbenzoate and t-butyl hydroperoxide.

35. A method in accordance with claim 26 in which step (c) comprises heating said prepolymer in the presence of a peroxyester free-radical initiator.

36. A method in accordance with claim 35 in which said peroxyester free-radical initiator is t-butyl perbenzoate.

37. A method in accordance with claim 1 in which step (c) comprises heating said prepolymer in the presence of a peroxide free-radical initiator and a polyfunctional active olefin in an amount effective in improving the cross-linking efficiency thereof.

38. A method in accordance with claim 37 in which said polyfunctional active olefin is a member selected from the group consisting of trimethylolpropane trimethacrylate and dimethylolpropane trimethacrylate.

39. A method in accordance with claim 37 in which said polyfunctional active olefin is trimethylolpropane trimethacrylate.

40. A method in accordance with claim 1 in which step (a) further comprises combining said prepolymer with a metal soap.

41. A method in accordance with claim 40 in which said metal soap is a member selected from the group consisting of cobalt naphthenate, manganese octoate and bismuth octoate.

42. A method in accordance with claim 40 in which said metal soap is cobalt naphthenate.

43. A method for preparing a controlledrelease formulation of an active substance, said method comprising:
   (a) forming solid resilient particles containing a substantially continuous network of pores open to the exterior of said particles; and
   (b) impregnating said pores with an impregnant comprising said active substance.

44. A method in accordance with claim 43 in which said solid resilient particles have an average diameter from about 1 micron to about 200 microns.

45. A method in accordance with claim 43 in which said solid resilient particles have a total pore volume of about 0.01 cc/g to about 4.0 cc/g.

46. A method in accordance with claim 43 in which said solid resilient particles have a total pore volume of about 0.1 cc/g to about 2.0 cc/g.

47. A method in accordance with claim 43 in which said solid resilient particles have a surface area of about 1 $m^2/g$ to about 500 $m^2/g$.

48. A method in accordance with claim 43 in which said solid resilient particles have a surface area of about 20 m²/g to about 200 m²/g.

49. A method in accordance with claim 43 in which said solid resilient particles have an average pore diameter of about 0.001 micron to about 3.0 microns.

50. A method in accordance with claim 43 in which said solid resilient particles have an average pore diameter of about 0.003 micron to about 1.0 micron.

51. A method in accordance with claim 43 in which step (a) comprises:
(i) combining an ethylene-propylene-diene prepolymer with a substantially water-immiscible liquid species which is inert with respect to said prepolymer to form a homogeneous. substantially water-immiscible liquid solution;
(ii) dispersing said liquid solution in an aqueous solution to form a suspension;
(iii) polymerizing said prepolymer in said suspension to form solid resilient particles containing said water-immiscible liquid species;
(iv) recovering said solid resilient particles from said suspension: and
(v) extracting said water-immiscible liquid species from said solid resilient particles.

52. A method in accordance with claim 51 in 10 which the diene in said ethylene-propylene-diene prepolymer is a member selected from the group consisting of dicyclopentadiene and 5-ethylidene-2-norbornene.

53. A method in accordance with claim 51 in which the diene in said ethylene-propylene-diene prepolymer is dicyclopentadiene.

54. A method in accordance with claim 51 in which said ethylene-propylene-diene prepolymer has a molecular weight ranging from about 1000 to about 30.000.

55. A method in accordance with claim 51 in which said ethylene-propylene-diene prepolymer has a molecular weight ranging from about 5000 to about 10,000.

56. A method in accordance with claim 51 in which said ethylene-propylene-diene prepolymer has an iodine number of from about 5 to about 50.

57. A method in accordance with claim 51 in which said ethylene-propylene-diene prepolymer has an iodine number of from about 8 to about 30.

58. A method in accordance with claim 51 in which step (iii) comprises heating said prepolymer in the presence of a peroxide free-radical initiator.

59. A method in accordance with claim 5B in which said peroxide free-radical initiator is a member selected from the group consisting of t-butyl perbenzoate and t-butyl hydroperoxide.

60. A method in accordance with claim 51 in which step (iii) comprises heating said prepolymer in the presence of a peroxyester free-radical initiator.

61. A method in accordance with claim 60 in which said peroxyester free-radical initiator is t-butyl perbenzoate.

62. A method in accordance with claim 51 in which step (iii) comprises heating said prepolymer in the presence of a peroxide free-radical initiator and a polyfunctional active olefin in an amount effective in improving the cross-linking efficiency thereof.

63. A method in accordance with claim 62 in which said polyfunctional active olefin is a member selected from the group consisting of trimethylolpropane trimethacrylate and dimethylolpropane trimethacrylate.

64. A method in accordance with claim 63 in which said polyfunctional active olefin is trimethylolpropane trimethacrylate.

65. A method in accordance With claim 51 in which step (a) further comprises combining said prepolymer with a metal soap.

66. A method in accordance with claim 65 in which said metal soap is a member selected from the group consisting of cobalt naphthenate, manganese octoate and bismuth octoate.

67. A method in accordance with claim 65 in which said metal soap is cobalt naphthenate.

68. A method in accordance with claim 51 in which said water-immiscible liquid species is a member selected from the group consisting of alkanes. cycloalkanes and aromatics.

69. A controlled release formulation of an active substance comprising solid resilient particles formed from the reaction product of cross-linking an ethylene-propylene-diene propolymer, said said particles containing a substantially continuous network of pores open to the exterior of said particles, said pores impregnated with said active substance.

70. A formulation in accordance with claim 69 in which said solid resilient particles have an average diameter from about 1 micron to about 200 microns.

71. A formulation in accordance with claim 69 in which said solid resilient particles have a total pore volume of about 0.01 cc/g to about 4.0 cc/g.

72. A formulation in accordance with claim 69 in which said solid resilient particles have a total pore volume of about 0.1 cc/g to about 2.0 cc/g.

73. A formulation in accordance with claim 69 in which said solid resilient particles have a surface area of about 1 m²/g to about 500 m²/g.

74. A formulation in accordance with claim 69 in which said solid resilient particles have a surface area of about 20 m²/g to about 200 m²/g.

75. A formulation in accordance with claim 69 in which said solid resilient particles have an average pore diameter of about 0.001 micron to about 3.0 microns.

76. A formulation in accordance with claim 69 in which said solid resilient particles have an average pore diameter of about 0.003 micron to about 1.0 micron.

77. A formulation in accordance with claim 69 in which said solid resilient particles are formed by
(i) combining an ethylene-propylene-diene prepolymer with a substantially water-immiscible liquid species which is inert with respect to said prepolymer to form a homogeneous, substantially water-immiscible liquid solution;
(ii) dispersing said liquid solution in an aqueous solution to form a suspension;
(iii) polymerizing said prepolymer in said suspension to form solid resilient particles containing said water-immiscible liquid species;
(i) recovering said solid resilient particles from said suspension; and
(v) extracting said water-immiscible liquid species from said solid resilient particles.

78. A formulation in accordance with claim 77 in which the diene in said ethylene-propylene-diene prepolymer is a member selected from the group consisting of dicyclopentadiene and 5-ethylidene-2-norbornene.

79. A formulation in accordance with claim 77 in which said water-immiscible liquid species is a member selected from the group consisting of alkanes, cycloalkanes and aromatics.

80. A formulation in accordance with claim 77 in which the diene in said ethylene-propylene-diene prepolymer is dicyclopentadiene.

81. A formulation in accordance with claim 77 in which said ethylene-propylene-diene prepolymer has a molecular weight ranging from about 1000 to about 30,000.

82. A formulation in accordance with claim 77 in which said ethylenepropylene-diene prepolymer has a molecular weight ranging from about 5000 to about 10,000.

83. A formulation in accordance with claim 77 in which said ethylene-propylene-diene prepolymer has an iodine number of from about 5 to about 50.

84. A formulation in accordance with claim 77 in which said ethylene-propylene-diene prepolymer has an iodine number of from about 8 to about 30.

85. A formulation in accordance with claim 77 in which step (iii) comprises heating said prepolymer in the presence of a peroxide free-radical initiator.

86. A formulation in accordance with claim 85 in which said peroxide free-radical initiator is a member selected from the group consisting of t-butyl perbenzoate and t-butyl hydroperoxide.

87. A formulation in accordance with claim 77 in which step (iii) comprises heating said prepolymer in the presence of a peroxyester free-radical initiator.

88. A formulation in accordance with claim 87 in which said peroxyester free-radical initiator is t-butyl perbenzoate.

89. A formulation in accordance with claim 77 in which step (iii) comprises heating said prepolymer in the presence of a peroxide free-radical initiator and a polyfunctional active olefin in an amount effective in improving the cross-linking efficiency thereof.

90. A formulation in accordance with claim 89 in which said polyfunctional active olefin is a member selected from the group consisting of trimethylolpropane trimethacrylate and dimethylolpropane trimethacrylate.

91. A formulation in accordance with claim 89 in which said polyfunctional active olefin is trimethylolpropane trimethacrylate.

92. A formulation in accordance with claim 77 in which step (a) further comprises combining said prepolymer with a metal soap.

93. A formulation in accordance with claim 92 in which said metal soap is a member selected from the group consisting of cobalt naphthenate. manganese octoate and bismuth octoate.

94. A formulation in accordance with claim 92 in which said metal soap is cobalt naphthenate.

* * * * *